Patented Sept. 15, 1953

2,652,429

UNITED STATES PATENT OFFICE 2,652,429

REACTION OF CRACKED PETROLEUM FRACTIONS, FORMALDEHYDE AND AMMONIUM HALIDES AND PRODUCTS

Howard D. Hartough, Pitman, Joseph J. Dickert, Jr., Westville, and Seymour L. Meisel, West Deptford Township, Gloucester County, N. J., assignors to Socony-Vacuum Oil Company, Incorporated, a corporation of New York No Drawing. Application June 17, 1950,
Serial No. 168,852

8 Claims. (Cl. 260—563)

In the co-pending application for United States Letters Patent Serial No. 129,948, filed November 29, 1949 in the names of Howard D. Hartough, Joseph J. Dickert, Jr., and Seymour L. Meisel, the co-pending application for United States Letters Patent Serial No. 169,792 filed June 22, 1950 in the names of Howard D. Hartough, Joseph J. Dickert, Jr., and Seymour L. Meisel and the co-pending application for United States Letters Patent Serial No. 159,126, filed April 29, 1950 in the names of Howard D. Hartough, Joseph J. Dickert, Jr., and Seymour L. Meisel, the aminomethylation of olefinic compounds has been described in general terms, with respect to obtaining increased yields of bis-(substituted tetrahydro-1,3-oxazino)-methanes and with respect to substituting aminomethylsulfonic acids for ammonium hydrohalide respectively. The present invention is concerned with the reaction between mixtures of olefinic compounds such as cracked gasolines, formaldehyde and hydrohalides of ammonia or primary amines or primary diamines and with the reduction of the compounds so obtained or obtained during the aminoalkylation of olefinic compounds.

It is an object of the present invention to provide a means for preparing amines from hydrocarbon mixtures containing olefinic compounds. It is another object of the present invention to provide a means for preparing amines from cracked gasolines containing olefinic compounds. It is a further object of the present invention to provide means for reducing the amine products produced by reacting an olefinic compound, an aldehyde and a hydrohalide of ammonia or a primary amine or a primary diamine. It is also within the scope of the present invention to provide acetic anhydride reaction products of the amines obtained by reacting an olefinic compound, an aldehyde and a hydrohalide of ammonia or a primary amine or a primary diamine. Other objects and advantages will become apparent from the following description of the present invention.

The preparation of amines from mixtures of hydrocarbons containing olefinic compounds such as the monoolefins and the diolefins is quite similar to that for the preparation of amines from substantially pure olefinic compounds. However, the amines obtained by the aminoalkylation of gasolines, for example, produced by the cracking (thermal or catalytic) of petroleum hydrocarbons are different to those obtained by the aminoalkylation of substantially pure olefins or mixtures of isomers of a particular olefin.

Illustrative but not limiting of the aminoalkylation of mixtures of hydrocarbons containing olefinic compounds are the following examples of the aminoalkylation of cracked gasoline derived from the thermal or catalytic cracking of petroleum hydrocarbons. The preparations designated as Examples II through XVII of Table I were carried out in the manner described more fully in Example I with such changes in conditions as indicated in the table.

EXAMPLE I

About 170 parts by weight of an aqueous, 36 per cent by weight solution of formaldehyde and about 54 parts by weight of ammonium chloride were added to about 150 parts by weight of thermally cracked gasoline having a boiling range of 153°–210° F., a bromine number of 99.2 and an olefin content of 54 weight per cent. The mixture was stirred vigorously and heated at the reflux temperature of the mixture (59°–60° C.) for about two hours. After cooling, the hydrocarbon phase was separated from the aqueous portion of the reaction mixture. Distillation of the hydrocarbon phase yielded about 124 parts by weight of unreacted gasoline and about 15 parts by weight of 1,3-dioxanes.

The aqueous portion of the reaction mixture was neutralized by caustic, extracted with diethyl ether, and the ether extract dried. Evaporation of the ether yielded about 32 parts by weight of amine containing 14.05 per cent nitrogen.

Table I

| Example No | Gasoline (type; parts by weight) | Formaldehyde (parts by weight; type) | NH4Cl, parts by weight | Reaction temperature, °C. | Reaction time, hours | Recovered gasoline formed (parts by weight) | Dioxanes formed (parts by weight) | Amines formed (parts by weight) (i) | Weight per cent nitrogen in amines |
|---|---|---|---|---|---|---|---|---|---|
| II | Vapor phase [a] thermally cracked, 150 | 60 para [b]; 18 water | 54 | 67 | 2 | 114 | 13 | 28 | 12.23 |
| III | ___do___ | 40 [c]; 36% aq. solution | 12 | 60-61 | 2 | 131 | 6 | 7 | 11.23. |
| IV | ___do___ | 170; 36% aq. solution | 54 | 59-60 | 2 | 124 | 15 | 32 | 14.05. |
|  |  | ___do___ | 54 | 59-60 | 2 | 128 | 14 | 38 | 11.69. |
| V | Vapor phase thermally cracked, 150 [d] | ___do___ | 54 | 59-60 | 2 | 129 | 6 | 27 | 10.65. |
|  |  | ___do___ | 54 | 59-60 | 1 | 130 | 13 |  |  |
| VI | ___do___ | ___do___ | 54 | 59-60 | 1 | 125 | 9 | 25 | 12.82. |
|  |  |  | 54 | 70-75 | 2 | 120 | 16 | 86 | 10.06. |
| VII | Vapor phase [e] thermally cracked; 150 | 60 para [b]; 18 water | 54 | 130 | 3 | 350 | 50 | 10 |  |
| VIII | Vapor phase [e] thermally cracked; 450 | 510; 36% aq. solution | 54 | 75-85 | 2 | [g] 137 | --- |  |  |
| IX | Vapor phase [f] thermally cracked recycle stock; 150 | 60 para [b] | 54 | 55-56 | 6 | [g] 77 | --- | 32 | 15.48. |
| X | Cracked [h]; 100 | 168; 36% solution | 54 | 64-67 | 6 | [g] 122 | --- | 35 | 13.63. |
| XI | Cracked [m]; 125 | ___do___ | 54 | 74 | 6 | 278 | 72 | 120 | 9.29. |
| XII | ___do___ | 540; 36% solution | 54 | 75-77 | 6 | 375 | 50 | 65 | [j] 7.86 (mol. wt. 427). |
| XIII | Cracked [m]; 450 | 450; 36% aq. solution |  |  |  |  |  | 45 | 13.30 (mol. wt. 684). |
| XIV | ___do___ | 336; 36% aq. solution | 54 | 75-77 | 6 | 380 | 60 | [k] 53 / 15 |  |
| XV | ___do___ | 252; 36% aq. solution | 54 | 75-77 | 6 | 390 | 40 | [k] 60 / 10 |  |
| XVI | ___do___ | 168; 36% aq. solution | 54 | 75-77 | 6 | 375 | 65 | 40 |  |
| XVII | ___do___ | 336; 36% aq. solution | [l] 108 | 75-77 | 6 | 375 | 58 | [k] 95 / 10 |  |

[a] Vapor phase thermally cracked gasoline:
Boiling range _____ 153°–210° F.
Bromine No. _____ 99.2.
Mol. wt. range _____ C₆+.
Olefin content _____ 54 wt. per cent.

[b] Paraformaldehyde.

[c] When approximate theoretical amounts of CH₂O and NH₄Cl are used, based on the amount of amine formed when excesses of both are used, the amount of amine formed decreases sharply.

[d] In these runs the first phase of the reaction was carried out in the usual manner. The unreacted gasoline was then removed and the additional amount indicated was added. This gasoline was then heated in the usual manner with the aqueous layer remaining after the removal of the unreacted gasoline in the first step.

[e] Vapor phase thermally cracked gasoline:
Boiling range _____ 208°–255° F.
Bromine No. _____ 84.4.
Mol. wt. range _____ C₇–C₈.
Olefin content _____ 55 wt. per cent.

[f] Recycle stock from vapor phase thermal cracking operation:
Boiling range _____ 50% below 402° F.
Bromine No. _____ 46.1
Mol. wt. range _____ C₁₁–C₁₂.
Olefin content _____ 46 wt. per cent.

[g] Dioxane not removed.

[h] Thermally cracked gasoline:
Boiling range _____ 112°–241° F.
Bromine No. _____ 150.
Mol. wt. range _____ C₆+.

[i] In runs XII through XVII an excess of CH₂O was used in all instances. The yields of amine vary with the amount of CH₂O employed.

[j] The neutralization of the reaction mixture in this run was carried out in step-wise fashion. When the theoretical amount of caustic had been added 65 parts by weight of amine containing 7.86% nitrogen and having a mol. wt. of 427 were obtained. After an excess of caustic had been added an additional 45 parts by weight of amine containing 13.30% nitrogen and having a mol. wt. of 684 separated.

[k] The procedure described in note (j) was employed.

[l] Increasing the amount of ammonium halide increased the yield of amine.

[m] Thermally cracked gasoline:
Boiling range _____ 195°–264° F.
Bromine No. _____ 122.5.
Mol wt. range _____ C₇+.

The foregoing tabulation is illustrative of the treatment of petroleum fractions containing olefinic compounds. It is also to be borne in mind that the ammonium chloride of Examples I through XVII can be replaced by other ammonium halides having a molecular weight of at least 53, the corresponding halide of substituted ammonias corresponding to the formula YNH₂(HX) in which Y is selected from the group consisting of hydrogen, hydroxyl, alkyl groups having less than 6 carbon atoms and aryl groups and X being a halogen having atomic weight greater than 19 as disclosed in the co-pending application Serial No. 129,943, filed November 29, 1949 in the names of Howard D. Hartough, Joseph J. Dickert, Jr. and Seymour L. Meisel and the primary diamines, for example ethylene diamine, propylene diamine, amylene diamine and the like.

Accordingly, the present invention provides a method for preparing nitrogenous compounds from petroleum fractions and particularly from light petroleum fractions such as the liquid normally gaseous hydrocarbons, gasoline and naphtha by reaction with the hydrohalide of ammonia or substituted ammonia having a composition corresponding to the formula YNH₂(HX) wherein Y has the significance set forth hereinbefore and formaldehyde either as an aqueous solution thereof or as a reversible polymer thereof in the presence of a depolymerizing catalyst therefore such as acetic acid, water and the like.

We claim:

1. A method of preparing basic nitrogenous derivatives from olefinic petroleum fractions which comprises mixing a petroleum hydrocarbon fraction containing olefinic materials with formaldehyde and a hydrohalide of ammonia in which the halogen has an atomic weight greater than 19, to form a reaction mixture, a maintaining said reaction mixture at a temperature of about 50° to about 150° C., and separating basic nitrogenous material formed thereby from the reaction mixture.

2. A method of preparing basic nitrogenous derivatives from olefinic petroleum fractions which comprises mixing a hydrocarbon fraction produced by the cracking of petroleum with formaldehyde and a hydrohalide of ammonia in which the halogen has an atomic weight greater than 19, to form a reaction mixture, maintaining said reaction mixture at a temperature of about 50° C. to about 150° C. and separating basic nitrogenous material formed thereby from the reaction mixture.

3. A method of preparing basic nitrogenous derivatives from olefinic petroleum fractions which comprises mixing a hydrocarbon fraction produced by the thermal cracking of petroleum with formaldehyde and a hydrohalide of ammonia in which the halogen has an atomic weight greater than 19, to form a reaction mixture, maintaining said reaction mixture at a temperature of about 50° to about 150° C., and separating basic nitrogenous material formed thereby from the reaction mixture.

4. A method of preparing basic nitrogenous derivatives from olefinic petroleum fractions which comprises mixing thermally cracked hydrocarbon gasoline with formaldehyde and a hydrohalide of ammonia in which the halogen has an atomic weight greater than 19, to form a reaction mixture, maintaining said reaction mixture at a temperature of about 50° to about 150° C., and separating basic nitrogenous material formed thereby from the reaction mixture.

5. A method of preparing basic nitrogenous derivatives from olefinic petroleum fractions which comprises mixing a petroleum hydrocarbon fraction containing olefinic materials with formaledhyde and ammonium chloride, to form a reaction mixture containing in excess of 2 moles of formaldehyde and 1 mole of said ammonium chloride per mole of olefinic material, maintaining said reaction mixture at a temperature of about 50° to about 150° C., and separating basic nitrogenous material so formed from said reaction mixture.

6. A method of preparing basic nitrogenous derivatives from olefinic petroleum fractions which comprises mixing a hydrocarbon fraction produced by thermal cracking of petroleum with formaldehyde and ammonium chloride, to form a reaction mixture containing in excess of 2 moles of formaldehyde and 1 mole of said ammonium chloride per mole of olefinic material, maintaining said reaction mixture at a temperature of about 50° C to about 150° C., and separating basic nitrogenous material so formed from said reaction mixture.

7. A method of preparing basic nitrogenous derivatives from olefinic petroleum fractions which comprises mixing a hydrocarbon fraction produced by cracking of petroleum with formaldehyde and ammonium chloride, to form a reaction mixture containing in excess of 2 moles of formaldehyde and 1 mole of said ammonium chloride per mole of olefinic material, maintaining said reaction mixture at a temperature of about 50° to about 150° C., and separating basic nitrogenous material so formed from said reaction mixture.

8. A nitrogenous reaction product containing between about 7.8 weight per cent and about 14 weight per cent of nitrogen produced by heating a reaction mixture of an olefinic petroleum hydrocarbon fraction produced by cracking of petroleum, formaldehyde, and ammonium chloride, at between about 55° C. and about 130° C., and for between about one hour and about six hours; said reaction mixture containing in excess of 2 moles of formaldehyde and 1 mole of ammonium chloride per mole of olefinic material.

HOWARD D. HARTOUGH.
JOSEPH J. DICKERT, Jr.
SEYMOUR L. MEISEL.

References Cited in the file of this patent

UNITED STATES PATENTS

| Number | Name | Date |
|---|---|---|
| 1,356,877 | Nagai | Oct. 26, 1920 |
| 1,889,678 | Mannich | Nov. 29, 1932 |
| 1,978,539 | Klarer et al. | Oct. 30, 1934 |
| 2,114,121 | Bender | Apr. 12, 1938 |
| 2,234,933 | Shelton | Mar. 11, 1941 |
| 2,297,221 | Huttenlacher | Sept. 29, 1942 |
| 2,365,825 | Kyrides | Dec. 26, 1944 |
| 2,453,086 | Caesar | Nov. 2, 1948 |
| 2,457,656 | Givens | Dec. 28, 1948 |

OTHER REFERENCES

Lukasiewicz et al., J. Am. Chem. Soc., vol. 68, pp. 1389–90 (1946).

Garbiel, Beilstein Hand. der Org. Chem., 1st Supp., vol. III and IV, p. 443.

Forneau, Beilstein Hand. der Org. Chem., 1st Supp., vol. III and IV, p. 446.

Pierce, Beilstein Hand. der Org. Chem., 2nd Supp., vol. III and IV, p. 735.

Mannich, Beilstein Hand, der Org. Chem., 2nd Supp., vol. III and IV, p. 741.

Levene, Beilstein Hand. de Org. Chem., 2nd Supp., vol. III and IV, p. 742.

Forneau, Beilstein Hand. der Org. Chem., 2nd Supp., vol. III and IV, p. 745.

Barger, Beilstein Hand. der Org. Chem., 2nd Supp., vol. III and IV, p. 747.